United States Patent [19]
Manatt

[11] Patent Number: 4,508,548
[45] Date of Patent: Apr. 2, 1985

[54] AIR OXYGEN AND NITROGEN CONCENTRATION DEVICE

[75] Inventor: Scott A. Manatt, Granada Hills, Calif.

[73] Assignee: The Garrett Corporation, Los Angeles, Calif.

[21] Appl. No.: 289,861

[22] Filed: Aug. 4, 1981

[51] Int. Cl.³ ............................................. B01D 53/22
[52] U.S. Cl. ......................................... 55/158; 55/16; 55/68
[58] Field of Search .................................... 55/16, 158

[56] References Cited

U.S. PATENT DOCUMENTS

| | | | |
|---|---|---|---|
| 3,135,591 | 6/1964 | Jones | 55/16 |
| 3,250,080 | 5/1966 | Garwin | 55/16 X |
| 3,422,008 | 1/1969 | McLain | 210/22 |
| 3,489,144 | 1/1970 | Dibelius et al. | 128/142.2 |
| 3,552,392 | 1/1971 | Dounoucos et al. | 128/204 |
| 3,616,928 | 11/1971 | Rosenblatt | 210/321 |
| 3,674,022 | 7/1972 | Dounoucos | 128/142 |
| 3,693,915 | 9/1972 | Ulanovsky | 244/135 R |
| 3,735,558 | 5/1973 | Skarstrom et al. | 55/16 |
| 3,832,830 | 9/1974 | Gerow | 55/158 |
| 3,961,917 | 6/1976 | Benedict et al. | 55/16 |
| 4,119,417 | 10/1978 | Heki et al. | 55/16 X |
| 4,180,388 | 12/1979 | Graham et al. | 55/16 |
| 4,198,213 | 4/1980 | Manatt | 55/158 X |
| 4,268,279 | 5/1981 | Shindo et al. | 55/16 |

Primary Examiner—Robert H. Spitzer
Attorney, Agent, or Firm—Albert J. Miller

[57] ABSTRACT

An air separation module is optimized for producing both an oxygen-concentrated and nitrogen-concentrated gas stream.

2 Claims, 3 Drawing Figures

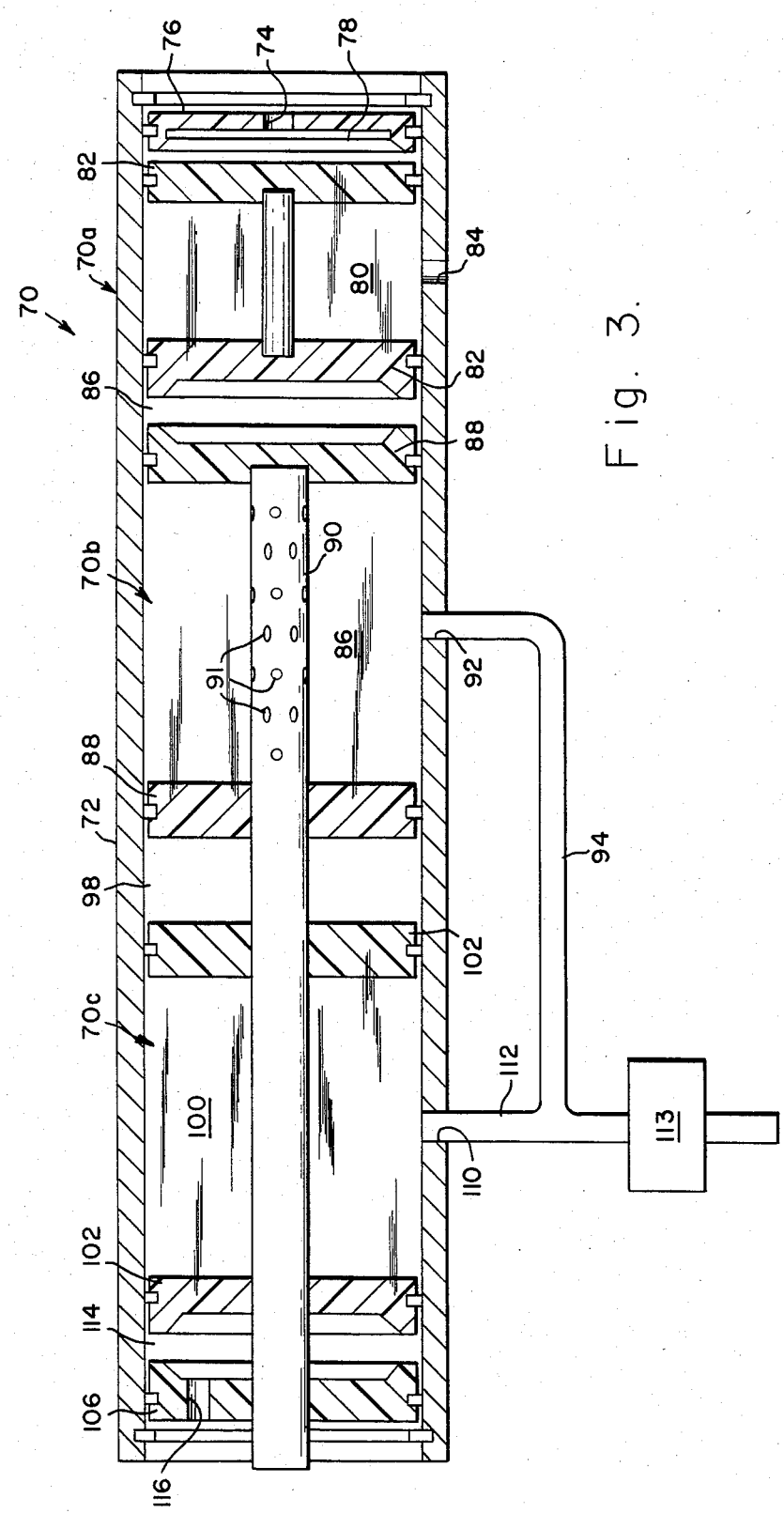

AIR OXYGEN AND NITROGEN CONCENTRATION DEVICE

This invention relates to air separation and, more particularly, to an apparatus and method for separating a single supply of air having ambient concentration of both oxygen and nitrogen into both a usable supply of gas possessing an enhanced nitrogen concentration and a usable supply of gas possessing an enhanced oxygen concentration.

In many applications, it may be desirable to have a supply of air having a relatively high oxygen concentration and/or air having a relatively high nitrogen concentration. One example is in aircraft wherein oxygen-enriched air may be utilized for breathing and nitrogen-enriched air may be fed to the ullage of fuel tanks or other enclosed spaces where fuel vapors may collect for inerting such spaces and preventing an explosive concentration of fuel vapor and oxygen from forming.

The requirements for such gases may be provided by on-board storage of oxygen gas and/or nitrogen gas. However, the use of such gas storage devices results in significant weight and space penalties which are highly undesirable in an aircraft environment.

It has been found that gas streams having a suitable concentration of either oxygen or nitrogen can be produced by introducing compressed air having an ambient concentration of both oxygen and nitrogen, such as bleed air from a turbine engine compressor stage, to a module containing permeable membranes across whose surface area a pressure differential is maintained. Because selected membranes are more permeable to oxygen than to nitrogen, it is possible, by maintaining an appropriate condition within the module, to produce a usable output gas which is highly concentrated in either nitrogen or oxygen. However, because the conditions required in the module for producing a gas stream of high oxygen concentration are not compatible with the conditions necessary to produce a gas stream having a high nitrogen concentration, no single module has heretofore been provided which is capable of generating two useable gas streams, one enriched in oxygen and the other enriched in nitrogen.

Thus, the production of both types of air streams has generally been considered to require the use of two separate modules with the resulting penalties in both weight and volume being increased. Further, additional bleed air must be drawn from the turbine engine compressor which can result in additional utilization of fuel and loss of engine power.

In accordance with this invention, both an oxygen-enriched gas stream and a nitrogen-enriched gas stream can be produced by a single module with the use of a single supply of engine bleed air. Bleed air is fed to a first portion of the module and fed through permeable membranes at high pressure such that a high pressure differential is maintained across the membrane surface to produce a high rate of oxygen permeation thereacross. Relatively short membrane segments are utilized so that a high pressure rapid flow of air is maintained and the exposure time of air to the membrane reduces the air's oxygen concentration insufficiently to permit significant permeation of nitrogen. The resulting oxygen-enriched gas may then be removed from the module for use.

The gas not having permeated the membrane, now somewhat reduced in oxygen concentration, is fed to a second portion of the module having membrane segments of greater length such that the rate of flow therethrough is substantially reduced and the exposure time of air to the membrane is increased. A high permeation rate may be maintained in this portion of the module by utilizing a wash of ambient concentration near ambient pressure air to dilute and remove the oxygen-enriched gas which has permeated through the membrane material. Alternatively, other means such as a jet pump may be used to reduce the pressure and withdraw permeated gas therefrom. Upon exiting the module, the gas which has not permeated the membrane is highly reduced in oxygen concentration so as to be a highly nitrogen concentrated gas which may then be used in any suitable manner.

The advantages of this invention may be better understood when the following specification is read in conjunction with the appended drawings, wherein:

FIG. 3 is a cross-sectional view of an alternate embodiment of the concentration module of this invention.

Figure 1:
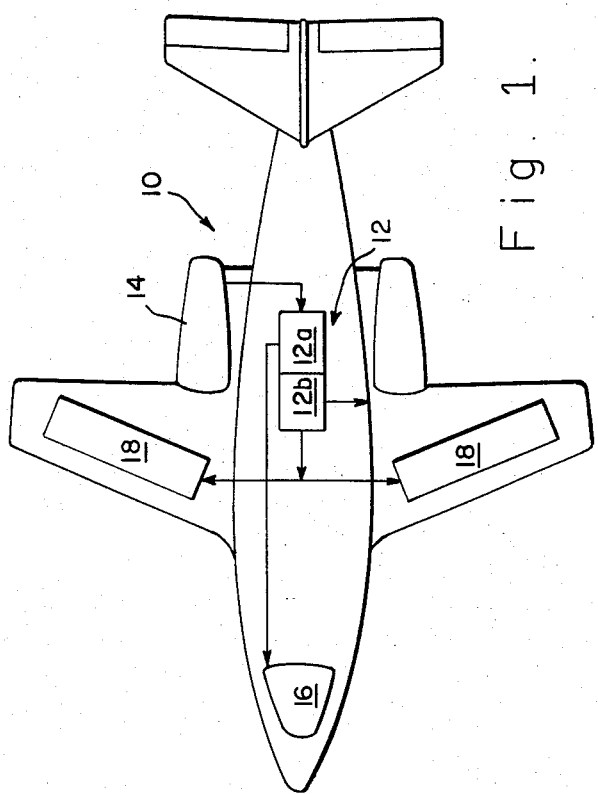
FIG. 1 is a generally schematic diagram illustrating the utilization of the concentration device of this invention in an aircraft.

Referring now to the drawings, FIG. 1 illustrates an airplane 10 utilizing an air oxygen and nitrogen concentration device 12 in accordance with this invention. Pressurized air, preferable in the form of bleed air from a turbine engine 14 is fed to the concentration device 12, entering an oxygen concentrating portion 12a. After separation within this portion of the module, oxygen-enriched air is removed which may be fed to appropriate environmental spaces, such as a cockpit 16, to be used for further oxygen enrichment or directly for breathing by any suitable means, such as causing flow of the gas stream into the cockpit atmosphere or through the utilization of a breathing mask.

The non-permeated gas from the oxygen concentration portion 12a is fed to a nitrogen concentration portion 12b which produces a nitrogen-enriched gas which may be fed by suitable flow and pressure control means (not shown) to the ullage of fuel tanks 18 or any other space where fuel vapors may concentrate to prevent occurrence of fire or explosion therein. The permeated gas stream from the nitrogen concentrating portion 12b is fed overboard.

Figure 2:
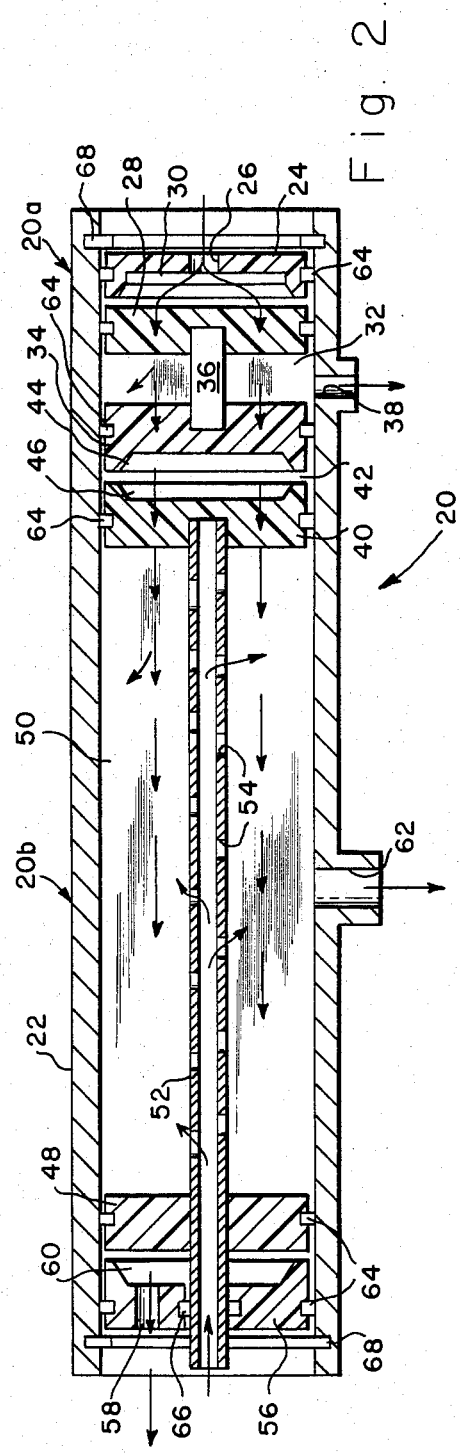
FIG. 2 is a cross-sectional view of a concentration module of this invention.

The concentration device of this invention is illustrated in detail in FIG. 2 in the form of a concentration module 20 having an oxygen concentration portion 20a and a nitrogen concentration portion 20b. The concentration module 20 has a housing 22 which may be tubular and formed of suitable metals such as aluminum or plastic, into which components of the concentration module may be inserted in sealing relationship.

An end wall 24, made of a suitable material such as aluminum, has an opening 26 therein adapted to receive bleed air from an engine or pressurized air from any other suitable source. The end wall 24 cooperates with a barrier 28 to form a manifold 30 which serves as an intake manifold for the oxygen concentration portion 20a.

The barrier 28 is preferable constructed by casting it of a plastic material which will adhere to the membrane fibers. However, the casting of the barrier 28 is performed in a manner to cause a plurality of hollow, permeable membrane fibers 32 to extend therethrough. In the preferred embodiment, the barrier 28 is cast at the same time as a barrier 34 with a suitable number of hollow, permeable membrane fibers 32 extending through both of these barriers. A rigid member 36 also connects the barriers 28 and 34 when cast to provide the proper separation between the barriers. After the barriers have been constructed, the ends of the fibers outside of the barriers are cut off to permit gas flow through the fibers. In the oxygen concentration portion, a fiber packing concentration of 40–60 percent would typically be appropriate. An aperture 38 in the housing 22 is positioned between the barriers 28 and 34 to accommodate the removal of oxygen-enriched gas from the oxygen concentration portion 20a.

Oxygen concentration portion 20a, due to its construction, is optimized for the production of oxygen-enriched gas. By utilizing a select number of selectively short fibers, the gas on the first side of the membrane, within the fibers 32, is maintained at high pressure to maintain a high pressure differential and a correspondingly high permeation rate across the membrane surface. However, because of the short exposure time of the air to the membrane, a very small portion of each quantity of gas permeates thereby maintaining the oxygen concentration which exits the barrier 34 at a level only slightly below its inlet concentration at barrier 28. The permeated gas is mostly oxygen and the high gas flow rate on the first side of the membrane results in a high flow rate of oxygen-enriched gas on the second side of the membrane, outside the fibers 32.

A barrier 40 of the nitrogen concentration portion 20b cooperates with the barrier 34 to form a manifold 42 which serves both as an outlet manifold for the oxygen concentration portion 20a and as an inlet manifold for the nitrogen concentration 20b. Spacing between the barriers 34 and 40 is provided by inwardly facing circumferential lips 44 and 46, respectively. The barrier 40 is formed along with a barrier 48 in a manner similar to that described with respect to barriers 28 and 34. The barriers 40 and 48 are formed with a plurality of hollow, permeable membrane fibers 50 extending therethrough. The exposed ends of the fibers are subsequently cut to permit the flow of gas within the fibers. In the nitrogen concentration portion 20b, a fiber packing concentration of 40–60 percent would typically be appropriate. Additionally, a rigid member must be mounted between the barriers. In this embodiment, this function is performed by a tube 52 which may be utilized in the nitrogen concentration process in a manner to be described subsequently herein. The tube 52, which has a plurality of perforations 54 therein, sealingly extends through barrier 48 and through an end wall 56 for receiving air near ambient pressure from a suitable source. An aperture 62 is formed in the housing 22 between barrier 40 and 48 to serve as an exhaust outlet for the nitrogen concentration portion 20b.

Nitrogen concentration portion 20b, due to its construction, is optimized for the production of nitrogen-enriched gas. By utilizing a relatively large number of relatively long fibers 50, the flow of air through the fibers is slower and there is a significantly increased exposure time of the air to the membrane. As a result, more of each portion of gas selectively permeates from the first side of the membrane, within the fibers 50, to the second side of the membrane, outside the fibers 50. Because the membrane is much more permeable to oxygen than nitrogen, at any location along the length of the fibers the percentage of the gas permeating through the walls of the hollow fibers is increased in oxygen concentration over the oxygen concentration of the gas inside of the tubes so that the gas remaining in the fibers 50 is greatly enriched in nitrogen. Although the gas pressure within the fibers is somewhat reduced due to the increase in fiber flow path lengths, the second side of the membrane is preferable connected to a pump or to the low pressure ambient atmosphere outside the airplane so that a high pressure differential is still maintained across the membrane surface.

End wall 56 has an opening 58 therein to permit passage of nitrogen concentrated gas from a manifold 60 formed by the end wall 56 and barrier 48 which serves as an outlet manifold for the nitrogen concentration portion 20b.

Gas flow around the barriers and end walls is prevented by the use of suitable sealing means such as O-rings 64 mounted in circumferential grooves around such members. An O-ring 66 provides sealing around the wash tube 52 as it passes through the end wall 56. Suitable means to position the end wall, such as lock rings 68, may be positioned, such as in internal grooves, at opposite end portions of the tubular housing 22 outside the end walls 24 and 56 to hold the components of the concentration module 20 securely together.

In operation, bleed air, preferably at a pressure of about 100 psi and a temperature of about 75° F. is fed from a propulsion engine of the aircraft through opening 26 in end wall 24 to enter manifold 30. This air has a generally ambient concentration of about 21% oxygen and 78% nitrogen therein and flows into the hollow permeable membrane fibers 32 in the oxygen concentration portion 20a between the barriers 28 and 34. Because of the relatively low surface area of the fibers 32, air flows therethrough at a high pressure such that only a small percentage of inlet gas is permitted to permeate the membrane. Because selected membranes are more permeable to oxygen than nitrogen and because of the brief time during which air is able to permeate the membrane, the gas flowing from the first side of the membrane within the fibers to the second side of the membrane outside the fibers has a high concentration of oxygen, generally on the order of 35–45%. This oxygen-enriched air flows through aperture 38 to be utilized for breathing or other purposes.

Because of the manner in which the oxygen-enriched air is obtained, the air flowing from the fibers 32 into the manifold 42, while somewhat depleted in oxygen still will have an oxygen concentration of about 18–20% as compared with the 21% oxygen concentration of ambient air. This is much higher than the oxygen concentration which is permissible for an inert, nitrogen enriched, gas flow wherein oxygen concentration will preferably be less than 9%. However, this gas now flows through the fibers 50 in the nitrogen concentration portion 20b which fibers are substantially extended in length in comparison to the fibers of the oxygen concentration portion 20a and may be significantly increased in surface area so that the air is exposed to the membrane for a much greater time. Thus, while nitrogen and other constituent gases in the air will flow through the membrane to a certain extent, a much greater proportion of oxygen will flow therethrough such that the air entering the manifold 60 has an oxygen concentration of 9% or less, the balance being principally nitrogen.

If nitrogen concentration were continued in this way, with oxygen flowing through the first side of the membrane within the fibers 50 to the second side of the membrane outside the fibers 50, oxygen concentration on the second side of the membrane would begin to increase as the ambient air therein were displaced by oxygen permeating the membrane. This oxygen would inhibit the nitrogen concentration ability of the nitrogen concentration portion 20b due to decreased oxygen partial pressure differential across the fiber walls. To prevent this, air having an ambient concentration of oxygen and nitrogen therein may be fed into the open end of the tube 52 and through the perforations 54 so that a continuous flow of ambient concentration air is provided around the fibers 50 exiting through the aperture 62 and thereby diluting and carrying with it the oxygen and other gases which have permeated the membrane. Thus, concentration of nitrogen within the air flowing through the fibers 50 will continue at a greater rate throughout the majority of the concentration module 20b. Alternately, removal of permeated gas may be achieved by allowing the flow to enter the apertures 54 in tube 52 and discharge through both openings 62 and the open end of the tube 52.

Nitrogen concentration may be enhanced by extending the length of the nitrogen concentration module or by adding more modules. An alternate embodiment of the concentration device of this invention is illustrated in FIG. 3 therein, a concentration module 70 has an oxygen concentration portion 70a, a first nitrogen concentration portion 70b and a second nitrogen concentration portion 70c, all of which may be contained in a single housing 72.

As in the embodiment of FIG. 2, air enters through an opening 74 in an end wall 76 to a manifold 78 and flows through hollow permeable membrane fibers 80 which are supported between barriers 82. Oxygen-enriched gas which permeates the membrane exits through an aperture 84 in the housing 72 located intermediate the barriers 82.

The air with a slightly reduced oxygen content which does not permeate the fibers 80 flows into a manifold 86 for entry into the first nitrogen concentration portion 70b in which hollow, permeable membrane fibers 86 are supported between barriers 88. A wash tube 90 is used to maintain suitable spacing for the barriers 88 and has a plurality of perforations 91 to release wash air from tube 90 to dilute and remove oxygen-enriched gas having permeated the membrane fibers 86 of the first nitrogen concentration portion 70b. The wash tube 90 may enter the first nitrogen concentration portion 70b through the second nitrogen concentration portion 70c (as shown) or alternately through either of the manifolds surrounding the first nitrogen concentration portion 70b. This oxygen enriched gas and wash air are exhausted through an aperture 92 in the housing 72 intermediate the barriers 88 into a conduit 94 to be exhausted overboard. Leakage would be prevented between the wash tube 90 and the barriers 88 and 102 by any suitable means such as bonding.

The gas remaining in the fibers, which is now depleted in oxygen concentration, flows into a manifold 98 and may be further depleted of oxygen in the second nitrogen concentration portion 70c in which hollow permeable membrane fibers 100 are held between barriers 102 which are separated by a supporting tube which in this embodiment comprises a portion of wash tube 90 which extends into the first nitrogen concentration portion 70b and also extends through an end wall 106.

Instead of using an air wash, the oxygen-enriched gas permeating the membrane fibers 100 may be exhausted through an aperture 110 in the housing 72 intermediate the barriers 102 into a conduit 112 to be exhausted overboard by a suitable pump 113, which is preferably in the form of a jet pump. By the use of such a pump, the oxygen-enriched gas is drawn from the second nitrogen concentration module to reduce the total pressure in the second nitrogen concentration module 70c, and therefore the oxygen partial pressure on the second side of the membrane which might impede the permeation of gases therethrough. Thus nitrogen-enrichment of the gas remaining on the first side of the membrane within the fibers is optimized. If desired conduit 94 from the first nitrogen concentration module 70b may also be connected to pump 113 to enhance the wash action in that module.

The use of two nitrogen concentration modules 70b, 70c provides an additional benefit in that by using a wash in the first module and an exhaust pump in the second module, nitrogen concentration of the product gas may be optimized. As gas flows through the fibers, some nitrogen, as well as oxygen flows through the membrane surface. Because the available oxygen is decreasing at a greater rate than the nitrogen, the concentration of oxygen on the second side of the membrane, while initially greatly above ambient, decreases toward the downstream end of the membrane and, at some intermediate point, becomes equal to ambient concentration at manifold 98. Note, however, that this oxygen concentration is still far greater than at the same point on the first side of the membrane. Beyond this point it is no longer beneficial to use wash air as this would increase the partial pressure of oxygen on the second side of the membrane. By dividing the nitrogen concentration module into two parts 70b and 70c at this point, maximum effectiveness can be obtained.

Nitrogen-enriched gas flows from the fibers 100 into a manifold 114 for passage through an opening 116 in the end wall 106. It is readily apparent that additional nitrogen enriching stages may be added such that substantial quantities of both oxygen-enriched and nitrogen-enriched gases may be provided in a high optimized manner utilizing a single source of bleed air or that additional modifications of the air oxygen and nitrogen concentration device disclosed herein may be made without departing from the spirit and scope of this invention.

I claim:

1. A system for producing oxygen enriched gas and oxygen depleted gas, said system comprising:
   a source of pressurized air;
   a tubular housing having an opening at one end to receive pressurized air from said source;
   a first plurality of hollow fibers disposed in said housing and having a fixed short length to receive pressuized air from the opening at one end of said housing to produce a high pressure rapid flow of air therethrough for a high rate of oxygen permeation thereacross without significant permeation of nitrogen, said tubular housing including an opening therein to remove the permeated oxygen enriched gas from said housing;
   a second plurality of hollow fibers disposed in said housing downstream of said first plurality of hollow fibers to receive oxygen depleted pressurized air therefrom and permeate oxygen therethrough, said second plurality of hollow fibers having a fixed length substantially greater than the fixed short length of said first plurality of hollow fibers to expose the oxygen depleted pressurized air to permeation in the hollow fibers for a greater period of time; and a perforated tube disposed amongst the second plurality of hollow fibers to wash the hollow fibers with ambient air to remove oxygen permeated therethrough and reduce the pressure at the exterior of the hollow fibers to enhance permeation therethrough, said tubular housing including openings to remove the mixture of permeated oxygen enriched gas and air from the perforated tube from said housing and to remove the oxygen depleted gas from the second plurality of hollow fibers.

2. A system for producing oxygen enriched gas and oxygen depleted gas, said system comprising:

a source of pressurized air;

a tubular housing having an opening at one end to receive pressurized air from said source;

a first plurality of hollow fibers disposed in said housing and having a fixed short length to receive pressurized air from the opening at one end of said housing to produce a high pressure rapid flow of air therethrough for a high rate of oxygen permeation thereacross without significant permeation of nitrogen, said tubular housing including an opening therein to remove the permeated oxygen enriched gas from said housing;

a second plurality of hollow fibers disposed in said housing downstream of said first plurality of hollow fibers to receive oxygen depleted pressurized air therefrom and permeate oxygen therethrough, said second plurality of hollow fibers having a fixed length substantially greater than the fixed short length of said first plurality of hollow fibers to expose the oxygen depleted pressurized air to permeation in the hollow fibers for a greater period of time;

a perforated tube disposed amongst the second plurality of hollow fibers to wash the hollow fibers with ambient air to remove oxygen permeated therethrough and reduce the pressure at the exterior of the hollow fibers to enhance permeation therethrough, said tubular housing including an opening to remove the mixture of permeated oxygen enriched gas and air from the perforated tube from said housing;

a third plurality of hollow fibers disposed in said housing downstream of said second plurality of hollow fibers to receive further oxygen depleted pressurized air therefrom and permeate oxygen therethrough, said third plurality of hollow fibers having a fixed length substantially greater than the fixed short length of said first plurality of hollow fibers to expose the further oxygen depleted pressurized air to permeation in the hollow fibers for a greater period of time, said tubular housing including openings to remove the permeated gas from said third plurality of hollow fibers and to remove the further oxygen depleted gas from the third plurality of fibers; and pump means to facilitate removal of the mixture of permeated oxygen enriched gas and air from the second plurality of hollow fibers and the permeated oxygen enriched gas from the third plurality of hollow fibers.

* * * * *